L. RENAULT.
ELECTRIC STARTING DEVICE FOR INTERNAL COMBUSTION ENGINES.
APPLICATION FILED AUG. 6, 1913.
1,162,309.
Patented Nov. 30, 1915.
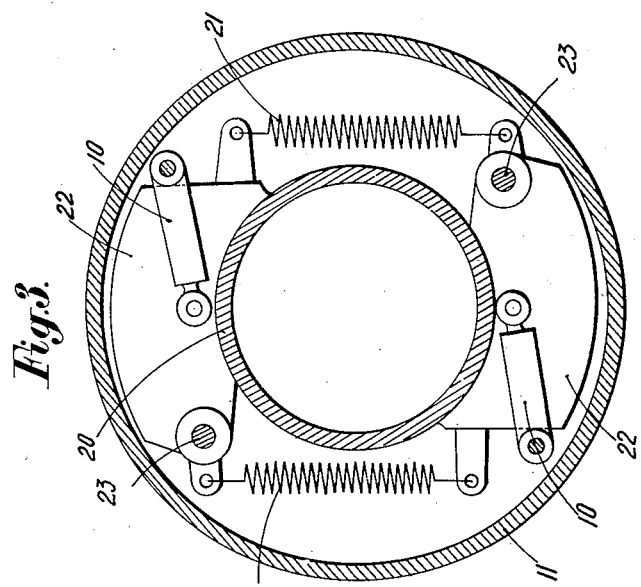
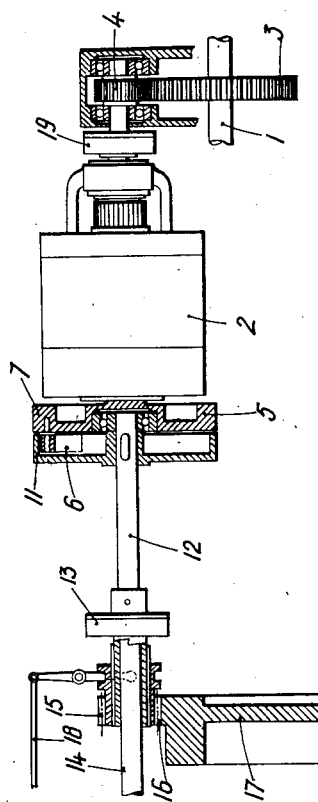
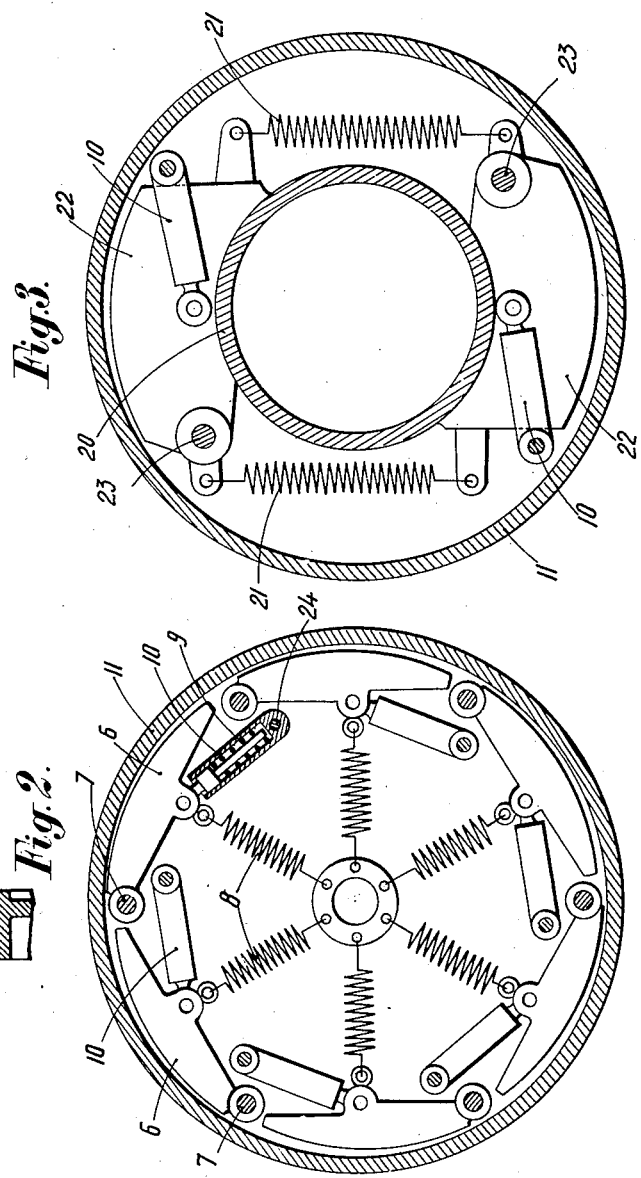
Witnesses:
E. C. Schuermann.
V. J. Houghton.
Inventor:
Louis Renault
by
Pennie Goldsborough Ittis
Attys

UNITED STATES PATENT OFFICE.

LOUIS RENAULT, OF BILLANCOURT, FRANCE.

ELECTRIC STARTING DEVICE FOR INTERNAL-COMBUSTION ENGINES.

1,162,309.  Specification of Letters Patent.  Patented Nov. 30, 1915.

Application filed August 6, 1913. Serial No. 783,397.

*To all whom it may concern:*

Be it known that I, LOUIS RENAULT, a citizen of the French Republic, residing at Billancourt, Department of the Seine, in France, have invented certain new and useful Improvements in Electric Starting Devices for Internal-Combustion Engines; and I do hereby declare the following to be a full, clear, and exact description of the invention, such as will enable others skilled in the art to which it appertains to make and use the same.

The invention relates to automobile vehicles driven by internal combustion engines of the kind which are equipped with an electric generator for the illumination of the vehicle and for charging a battery of accumulators.

The principle of the invention consists in operating the generator as a motor by means of the current supplied by the battery of accumulators so that the generator will act to drive the flywheel of the engine.

The invention is illustrated more or less diagrammatically in the accompanying drawings, in which—

Figure 1 is a broken elevation, partly in section, of the starting mechanism showing the general arrangement of parts; Fig. 2 is a sectional view of the automatic clutch mechanism employed; and Fig. 3 is a sectional view of a modified form of the automatic clutch mechanism.

1 designates a shaft driven by the engine and serving to rotate the generator 2, for instance, by means of the two pinions 3 and 4. A free wheel device 19 is interposed between the pinion 4 and the generator 2 so as to permit the generator to operate as a motor. This arrangement operates in the ordinary manner when the dynamo is driven by the engine, either to charge the accumulators or to illuminate the vehicle. The mechanism which serves to start the engine by means of the generator and which forms the object of the present invention is as follows: The shaft of the generator carries a flywheel 5 in which weights 6 are mounted (see details in Fig. 2). These weights pivot about axes 7 provided on the flywheel 5 and under the action of centrifugal force are adapted to move away from the center toward which they are caused to return, when inoperative, by means of the springs 8. Compression springs 9 guided within casings 10 pivoted about 24 upon the flywheel 5, are arranged in such a manner that their action, which tends to move the weights 6 away from the center, increases in proportion to the displacement of these weights so that once the latter are in motion the action of the springs 9 is added to the centrifugal force. The weights 6 are provided externally of the flywheel 5 so as to be within a hollow plate 11 mounted upon a shaft in alinement with that of the generator shaft but not connected therewith.

It will be understood from the foregoing description that as soon as the generator attains a certain speed, the weights 6 will move outwardly and bear upon the inner part of the plate 11. The action of the centrifugal force is increased by that of the springs 9 as afore stated; so as to cause the instantaneous rotation of the plate 11. The springs 9 act in such a direction with respect to the pivot points of the weights that when the weights are thrown outwardly a predetermined distance by centrifugal force, the springs 9 will cause a sudden engagement between the weights and the plate 11. The flywheel, therefore, does not rotate the plate 11 gradually, but is suddenly connected therewith so that the internal combustion engine will be rotated at sufficient speed to start the same immediately upon the engagement of the weights with the plate 11.

The shaft 12 to which the plate 11 is keyed, drives the shaft 14 by means of a free wheel device 13 comprising pawls carried by the latter shaft 12. A pinion 15 slides by means of grooves, upon the shaft 14 and meshes with the teeth 16 formed on the periphery of the flywheel 17 of the engine.

The operation of the device is as follows: The whole arrangement being at rest, the driver slides, by means of any operating device 18, the pinion 15 on the shaft 14 so as to cause pinion 15 to mesh with teeth 16; he then causes the current supplied by the accumulators to pass to the generator 2; the latter at once starts to rotate and as soon as it has acquired a sufficiently high speed, the weights 6 bear upon the interior of the plate 11 which drives the shaft 12 and, by means of the pawl device 13 drives the pinion 15 and the flywheel 17 of the engine which is thus started. As soon as the internal combustion engine has picked up speed, the pinion 15 rotates faster than the shaft 12 driven by the generator. At this moment the free wheel device 13 comes into operation and its pawls move away from the ratchet wheel under the influence of centrifugal force; the driver now separates pinion 15 and teeth 16 by sliding the pinion 15 upon the shaft 14 by means of the device 18.

Fig. 3 shows a portion of a modified construction which enables the free wheel 19 to be dispensed with. According to this modification a drum 20 is driven by the generator. Upon this drum weights 22 are caused to bear by means of the springs 21, said weights being mounted upon axes 23 integral with a flywheel 5. These weights 22, under the influence of centrifugal force, bear upon the interior of the plate 11, as in the other form described above. In this modification, while the speed of the generator is low, the weights 22 remain upon the drum 20 so that the flywheel 5 is driven at the same speed as the generator, the plate 11 remaining, on the contrary, idle; as soon as the generator has attained a sufficient speed, the weights 22 now move away from the drum 20 under the influence of centrifugal force and this latter force increased by the action of the springs 9, as in the other form, causes these weights to bear upon the interior of the plate 11 which, in its turn, is driven. It will be seen in this second device the generator does not start the engine directly. It merely serves to impart a high speed to the flywheel 5 and it is the *vis viva* of the flywheel which starts the engine. It must be noted that also in the first case the flywheel 5 is turned to good use for starting the engine because at this time its *vis viva* increases the force furnished by the generator.

I claim:

1. Starting mechanism for internal combustion engines, comprising a motor, a driven shaft adapted to start the internal combustion engine, a fly-wheel associated with the motor, coupling weights carried by the fly-wheel and adapted to be thrown outwardly by centrifugal force, the said driven shaft having a part to be engaged by said weights when thrown outwardly to thereby connect the fly-wheel with the driven shaft, and means to cause sudden engagement between the weights and the part with which they engage.

2. The combination of a motor, a fly-wheel driven thereby, an internal combustion engine normally disconnected from the fly-wheel, a centrifugal clutch interposed between the fly-wheel and the engine, and spring mechanism so associated with said clutch as to suddenly connect the fly-wheel with the engine when the former attains sufficient speed.

3. The combination of a motor, a fly-wheel driven thereby, an internal combustion engine normally disconnected from the fly-wheel, and a centrifugal clutch interposed between the fly-wheel and the engine adapted to disconnect the fly-wheel from the motor when the former attains sufficient speed and to connect the same with the engine.

4. The combination of a motor, a driven shaft normally disconnected from said motor, an internal combustion engine adapted to be started from said driven shaft, a fly wheel associated with the motor, coupling weights carried by the fly wheel and adapted to be thrown outwardly by centrifugal force, said driven shaft having a part to be engaged by said weights when thrown outwardly to thereby connect the fly wheel with the driven shaft, and springs for causing sudden engagement between said weights and said part after the weights are thrown outwardly a predetermined distance by centrifugal force.

In testimony whereof I affix my signature, in presence of two witnesses.

LOUIS RENAULT.

Witnesses:
HANSON C. COXE,
EMILE KLOTZ.